(12) United States Patent
Ki et al.

(10) Patent No.: US 6,285,159 B1
(45) Date of Patent: Sep. 4, 2001

(54) PORTABLE COMPUTER USABLE WITH A SPECIFIC BATTERY PACK OR ORDINARY BATTERY

(75) Inventors: Sae-Woon Ki, Chungcheongnam-do; Joung-Nam Moon, Seoul, both of (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/351,142

(22) Filed: Jul. 12, 1999

(30) Foreign Application Priority Data

Jul. 11, 1998 (KR) .................................................. 98-28044

(51) Int. Cl.[7] ........................................................ H02J 7/00
(52) U.S. Cl. ........................................... 320/112; 320/114
(58) Field of Search ................................ 320/107, 110, 320/113, 114, 106; 429/98, 99

(56) References Cited

U.S. PATENT DOCUMENTS

| | | | |
|---|---|---|---|
| 5,028,806 | 7/1991 | Stewart et al. ........................ | 307/66 |
| 5,149,604 | 9/1992 | Nakanishi .............................. | 429/97 |
| 5,153,817 | 10/1992 | Hosoi et al. ........................... | 429/27 |
| 5,162,719 * | 11/1992 | Tomura et al. ....................... | 320/110 |
| 5,200,883 | 4/1993 | Kobayashi ............................ | 361/683 |
| 5,553,294 | 9/1996 | Nanno et al. ......................... | 713/340 |
| 5,602,456 * | 2/1997 | Cargin, Jr. et al. .................. | 320/112 |
| 5,633,572 | 5/1997 | Steele et al. .......................... | 320/107 |
| 5,635,814 * | 6/1997 | Afzal et al. ........................... | 320/111 |
| 5,670,267 | 9/1997 | Lee ......................................... | 429/9 |
| 5,784,626 | 7/1998 | Odaohara .............................. | 320/128 |
| 5,786,984 | 7/1998 | Bonardi et al. ....................... | 361/686 |
| 5,818,197 * | 10/1998 | Miller et al. .......................... | 320/107 |
| 5,844,401 * | 12/1998 | Lee ......................................... | 320/107 |
| 5,867,007 | 2/1999 | Kim ........................................ | 320/118 |
| 5,875,085 * | 2/1999 | Farley .................................... | 361/18 |
| 5,963,019 * | 10/1999 | Cheon ................................... | 320/150 |
| 5,973,476 * | 10/1999 | Irvin ...................................... | 320/112 |
| 5,999,410 * | 7/1998 | Weiler ................................... | 320/110 |
| 6,005,368 * | 6/1998 | Frame ................................... | 320/113 |
| 6,014,009 * | 1/2000 | Wierzbicki et al. ................. | 320/107 |
| 6,023,147 * | 2/2000 | Cargin, Jr. et al. .................. | 320/114 |
| 6,040,684 * | 3/2000 | Mitchell ............................... | 320/139 |
| 6,049,144 * | 4/2000 | Frannhagen et al. ................ | 320/136 |

* cited by examiner

*Primary Examiner*—Peter S. Wong
*Assistant Examiner*—Pia Tibbits
(74) *Attorney, Agent, or Firm*—Robert E. Bushnell, Esq.

(57) ABSTRACT

A portable computer, capable of being powered by a specific rechargeable battery pack or by ordinary batteries, comprises a battery door opening formed in one side of a housing for mounting various electronic devices together with a printed circuit board, and a battery storage casing having a bottom and four side walls and an upper battery insertion opening to store the specific battery pack or ordinary batteries. The battery storage casing is mounted in the housing so as to make the upper battery insertion opening face the battery door opening. The internal space of the battery storage casing is designed to accommodate either the specific rechargeable battery pack or ordinary batteries. Thus, the portable computer may be driven by the specific rechargeable battery pack or one or more ordinary batteries installed in the battery storage casing. The battery storage casing has at least a support ridge formed between the bottom wall and side walls, and the battery pack has at least a corresponding recess to receive the support ridge, so that the battery pack is properly inserted in the battery storage casing. Additionally provided are a charging-protective circuit, first contacts connected to the charging-protective circuit in the battery storage casing, and second contacts formed in one side of the battery storage casing to make electrical connections with the first contacts.

23 Claims, 5 Drawing Sheets

PORTABLE COMPUTER USABLE WITH A SPECIFIC BATTERY PACK OR ORDINARY BATTERY

CLAIM OF PRIORITY

This application makes reference to, incorporates the same herein, and claims all benefits accruing under 35 U.S.C. § 119 from an application entitled A PORTABLE COMPUTER USABLE A COMPUTER-SPECIFIC BATTERY PACK OR ORDINARY BATTERY earlier filed in the Korean Industrial Property Office on the 11$^{th}$ day of July 1998, and there duly assigned Serial No. 98-28044, a copy of which is annexed hereto.

BACKGROUND OF THE INVENTION

1. Technical Field

The present invention relates to a computer and a power source, and more particularly to a portable computer to be driven by a specific battery pack or ordinary batteries.

2. Related Art

Computer systems are information handling systems that are utilized by many individuals and businesses today. A computer system can be defined as a microcomputer that includes a central processing unit (CPU) component in combination with some or all of the following additional components: a volatile memory, a non-volatile memory such as read only memory (ROM), a display monitor, a keyboard or keypad, a mouse or other input device such as a trackball, a floppy diskette drive, a compact disc-read only memory (CD-ROM) drive, a modem, a hard disk storage device, and a printer. A computer system's main board, which is a printed circuit board known as a motherboard, is used to electrically connect the above-referenced components together. A computer system can be a desktop computer, a personal computer, a portable computer such as a notebook computer or palm-sized computer, or other type of computer.

A small portable computer which can fit in a pocket can be a wallet personal computer, a personal digital assistant (PDA), a hand-held personal computer (HPC), a palm-sized computer, or other portable computer. Such small, palm-sized computers are becoming more popular because the small size makes them more portable than medium-sized notebook computers.

Such palm-sized computers are usually driven by a portable power supply with a limited capacity such as a rechargeable battery. The consumed battery should be replaced by a new one or recharged. Generally, I have found that a rechargeable battery pack specifically designed for use in one particular type of computer cannot be used with other types of computers. In other words, such a specific rechargeable battery pack is not compatible with other types of computers.

I have found that certain sizes and incompatibilities of battery packs and batteries can make a portable computer inconvenient to use. Efforts have been made to improve battery pack structures and batteries.

One exemplar recent efforts in the art is U.S. Pat. No. 5,670,267 for BATTERY STORAGE PACK ADAPTER FOR A PORTABLE COMPUTER issued to Lee. In particular, the aforementioned Lee '267 proposed an additional battery casing for mounting ordinary batteries in a portable computer. However, the additional battery casing adversely affects miniaturization of the portable computer. In other words, the additional battery casing prevents a certain reduction in size of the portable computer.

Additional exemplars of recent efforts in the art include U.S. Pat. No. 5,028,806 for BATTERY REPLACEMENT SYSTEM FOR BATTERY-POWERED DIGITAL DATA HANDLING DEVICES issued to Stewart et al., U.S. Pat. No. 5,149,604 for BATTERY ACCOMMODATING STRUCTURE issued to Nakanishi, U.S. Pat. No. 5,153,817 for ELECTRONIC APPARATUS SYSTEM INCLUDING AN EXPANSION DEVICE REMOVABLY CONNECTED TO A REMOVABLE BATTERY PACK issued to Hosoi et al., U.S. Pat. No. 5,200,883 for PORTABLE COMPUTER HAVING AN EXTERNAL BATTERY MOUNTING PORTION AND OPTIONAL DEVICE MOUNTING PORTION issued to Kobayashi, U.S. Pat. No. 5,553,294 for PORTABLE COMPUTER POWERED BY RECHARGEABLE BATTERIES issued to Nanno et al., U.S. Pat. No. 5,633,572 for BACK-UP POWER SUPPLY WITH REPLACEABLE BATTERY PACK issued to Steele et al., U.S. Pat. No. 5,784,626 for BATTERY CONNECTING DEVICE FOR A COMPUTER SYSTEM AND A METHOD OF SWITCHING BATTERIES issued to Odaohara, U.S. Pat. No. 5,786,984 for MODULAR PORTABLE PERSONAL COMPUTER issued to Bonardi et al., and U.S. Pat. No. 5,867,007 for SELECTION CIRCUIT FOR DUAL BATTERIES IN A BATTERY POWERED ELECTRONIC DEVICE issued to Kim.

In a portable computer not requiring any additional battery casing, let us suppose that a first battery pack has been consumed. At this time, the portable computer shall require either a recharging of the consumed first battery pack or a second battery pack which is compatible with the portable computer. This requirement can cause inconvenience and economic hardship to the user. The user either must spend the time to recharge the first battery pack, or must spend money to purchase a second battery pack which is specifically compatible with that particular portable computer.

While the above-referenced related art provides advantages, I note that such related art fails to adequately provide a portable computer which can conveniently use either a specific battery pack or ordinary batteries.

SUMMARY OF THE INVENTION

It is an object of the present invention to provide a portable computer which may accommodate and use ordinary batteries, and which may accommodate and use a specific battery pack.

It is a further object of the present invention to provide a portable computer designed to eliminate a need for an additional battery adapter unit when ordinary batteries are used as a power source for the portable computer.

According to an aspect of the present invention, a portable computer useable with a specific rechargeable battery pack or ordinary batteries, comprises a battery door opening formed in one side of a housing for mounting various electronic devices together with a printed circuit board, and a battery storage casing having a bottom and four side walls and an upper battery insertion opening to store the specific battery pack or ordinary batteries. The battery storage casing is mounted in the housing so as to make the upper battery insertion opening face the battery door opening. The internal space of the battery storage casing is designed to accommodate either the specific rechargeable battery pack or ordinary batteries. Thus, the portable computer may be driven by the specific rechargeable battery pack or one or more ordinary batteries installed in the battery storage casing. The battery storage casing has at least a support ridge formed between the bottom wall and side walls, and the battery pack has at least a corresponding recess to receive the support ridge, so that the battery pack is properly inserted in the battery storage casing. Additionally provided are a charging-protective circuit, first contacts connected to the charging-protective circuit in the battery storage casing, and second contacts formed in one side of the battery storage casing to make electrical connections with the first contacts.

According to another aspect of the present invention, a portable computer useable with a specific rechargeable battery pack or ordinary batteries, comprises a battery door opening formed in one side of a housing for mounting various electronic devices together with a printed circuit board, a battery storage casing having a bottom and front, back, left and right side walls and an upper battery insertion opening to store the specific battery pack or ordinary batteries, the battery storage casing being mounted in the housing so as to make the upper battery insertion opening face the battery door opening, and the internal space of the battery storage casing being designed to accommodate either the specific rechargeable battery pack or ordinary batteries, and terminal contact members disposed in the battery storage casing to electrically connect the specific battery pack or ordinary batteries with the printed circuit board. Thus, the portable computer may be driven by the specific rechargeable battery pack or one or more ordinary batteries installed in the battery storage casing.

Preferably, the battery storage casing has at least a support ridge formed between the bottom wall and side walls, and the battery pack has at least a corresponding recess to receive the support ridge, so that the battery pack is properly inserted in the battery storage casing. Additionally provided are a charging-protective circuit, first contacts connected to the charging-protective circuit in the battery storage casing, and second contacts formed in one side of the battery storage casing to make electrical connections with the first contacts, thereby stabilizing the charging of the battery pack. There are also provided a door for closing or opening the battery door opening, and a chassis for holding the printed circuit board fixed in the housing. Preferably, the battery storage casing is integrally formed with the chassis. Thus, for the inventive portable computer may be used both the specific rechargeable battery pack and ordinary batteries without any additional means or attachment. This provides the portable computer with more feasibility.

To achieve these and other objects in accordance with the principles of the present invention, as embodied and broadly described, the present invention provides a computer apparatus, comprising: a housing forming a battery door orifice in a side of said housing, said housing receiving a plurality of electronic units and at least one printed circuit board; and a battery storage unit having a bottom wall and four side walls and an upper battery insertion orifice, said battery storage unit receiving either a battery pack or a plurality of individual batteries, said battery storage unit being formed to accommodate the battery pack, said battery storage unit being formed to accommodate the plurality of individual batteries, said battery storage unit being fixedly mounted in said housing with said upper battery insertion orifice facing the battery door orifice, the battery pack and the plurality of individual batteries corresponding to power sources supplying power to said apparatus.

To achieve these and other objects in accordance with the principles of the present invention, as embodied and broadly described, the present invention provides a computer apparatus, comprising: a housing forming a battery door orifice in a side of said housing, said housing receiving a plurality of electronic units and at least one printed circuit board; a battery storage unit having a bottom wall and four side walls and an upper battery insertion orifice, said battery storage unit receiving either a battery pack or at least one individual battery, said battery storage unit being formed to accommodate the battery pack, said battery storage unit being formed to accommodate the at least one individual battery, said battery storage unit being fixedly mounted in said housing with said upper battery insertion orifice facing the battery door orifice, the battery pack and the at least one individual battery corresponding to power sources supplying power to said apparatus; and a plurality of terminal contact members disposed in said battery storage unit, said terminal contact members electrically connecting the battery pack with said printed circuit board when said battery storage unit receives the battery pack, said terminal contact members electrically connecting the at least one individual battery with said printed circuit board when said battery storage unit receives the at least one individual battery, said power source supplying power to said apparatus through said plurality of terminal contact members.

To achieve these and other objects in accordance with the principles of the present invention, as embodied and broadly described, the present invention provides an apparatus, comprising: a battery-operated portable computer; and a battery compartment being fixedly mounted in said computer, said battery compartment removably storing either a first battery or a plurality of second batteries in an interior thereof, said battery compartment being formed to accommodate said first battery, said battery compartment being formed to accommodate said plurality of second batteries, said battery compartment having a plurality of conductive members connecting with respective terminals of said first battery when said first battery is stored in said battery compartment, said battery compartment having a plurality of conductive members connecting with respective terminals of said plurality of second batteries when said plurality of second batteries is stored in said battery compartment, said battery compartment having a battery door by which a user accesses said interior of said battery compartment.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF THE PREFERRED EMBODIMENT

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention. Throughout the attached drawings are used the same reference numerals to represent the same functional parts.

Figure 1:
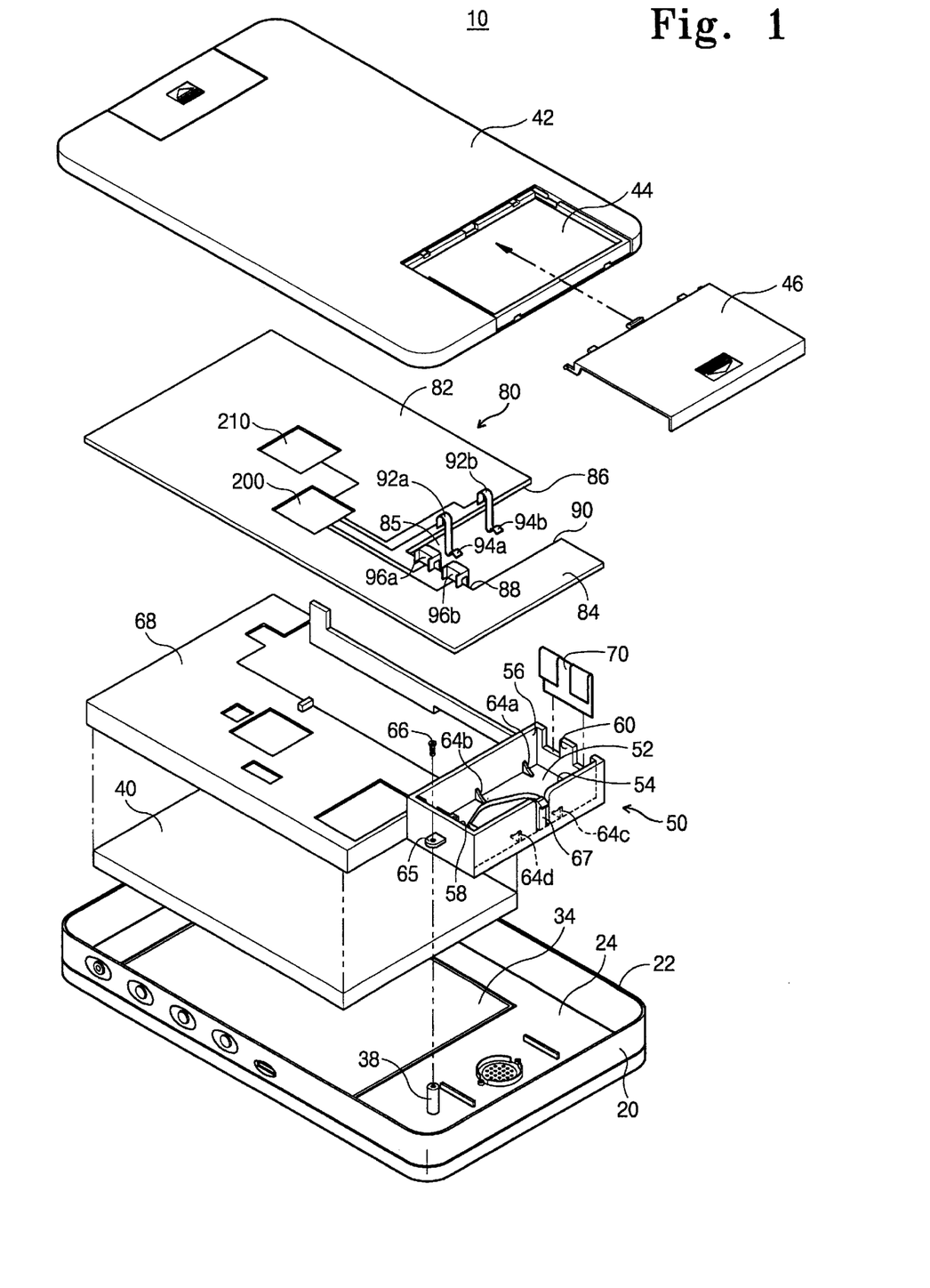
FIG. 1 is an exploded perspective view illustrating a wallet personal computer (PC) where the battery storage casing is integrally formed with the chassis, in accordance with the principles of the present invention.
Figure 2:
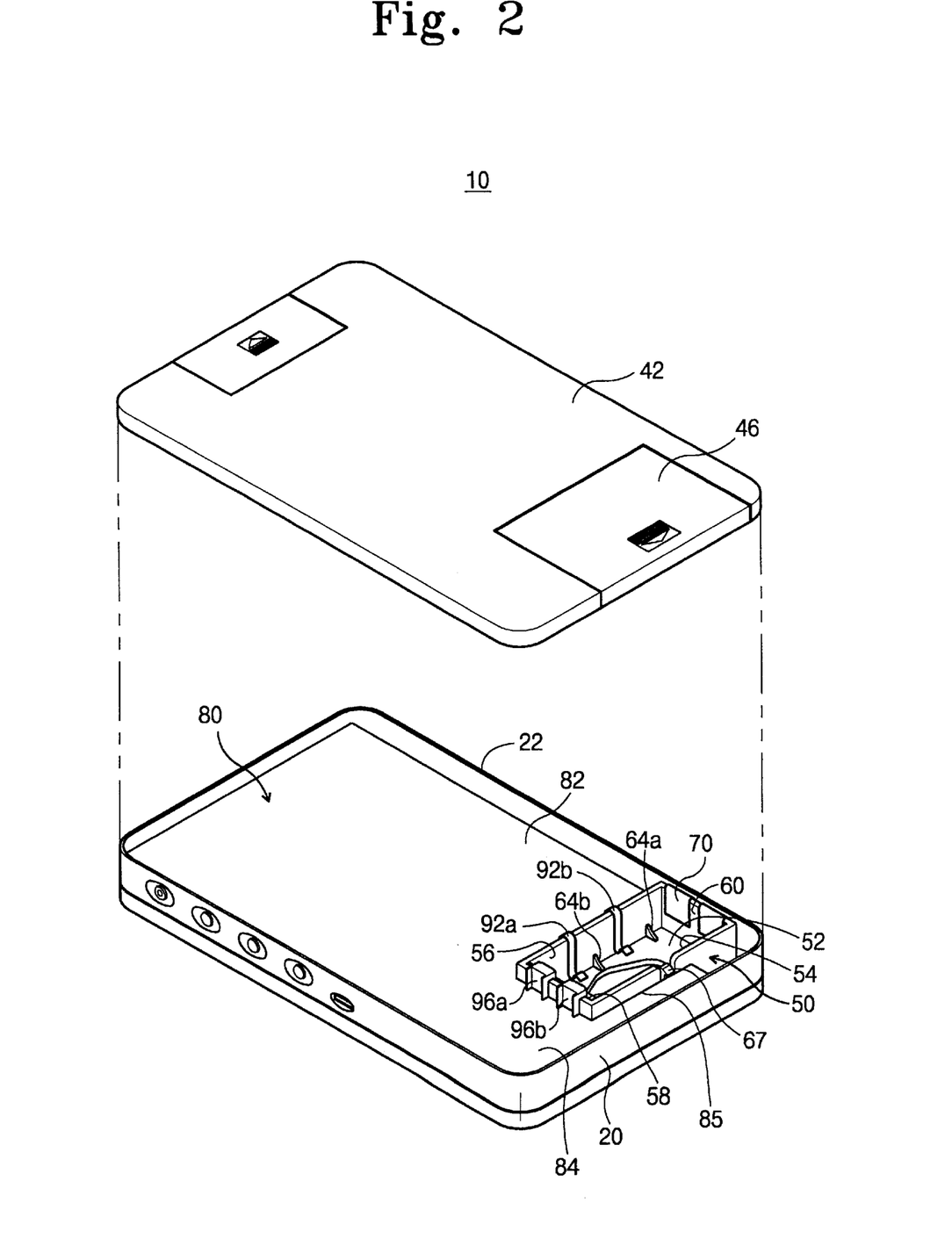
FIG. 2 is a perspective view illustrating the chassis associated with the printed circuit board in a wallet personal computer of FIG. 1, in accordance with the principles of the present invention.
Figure 3:
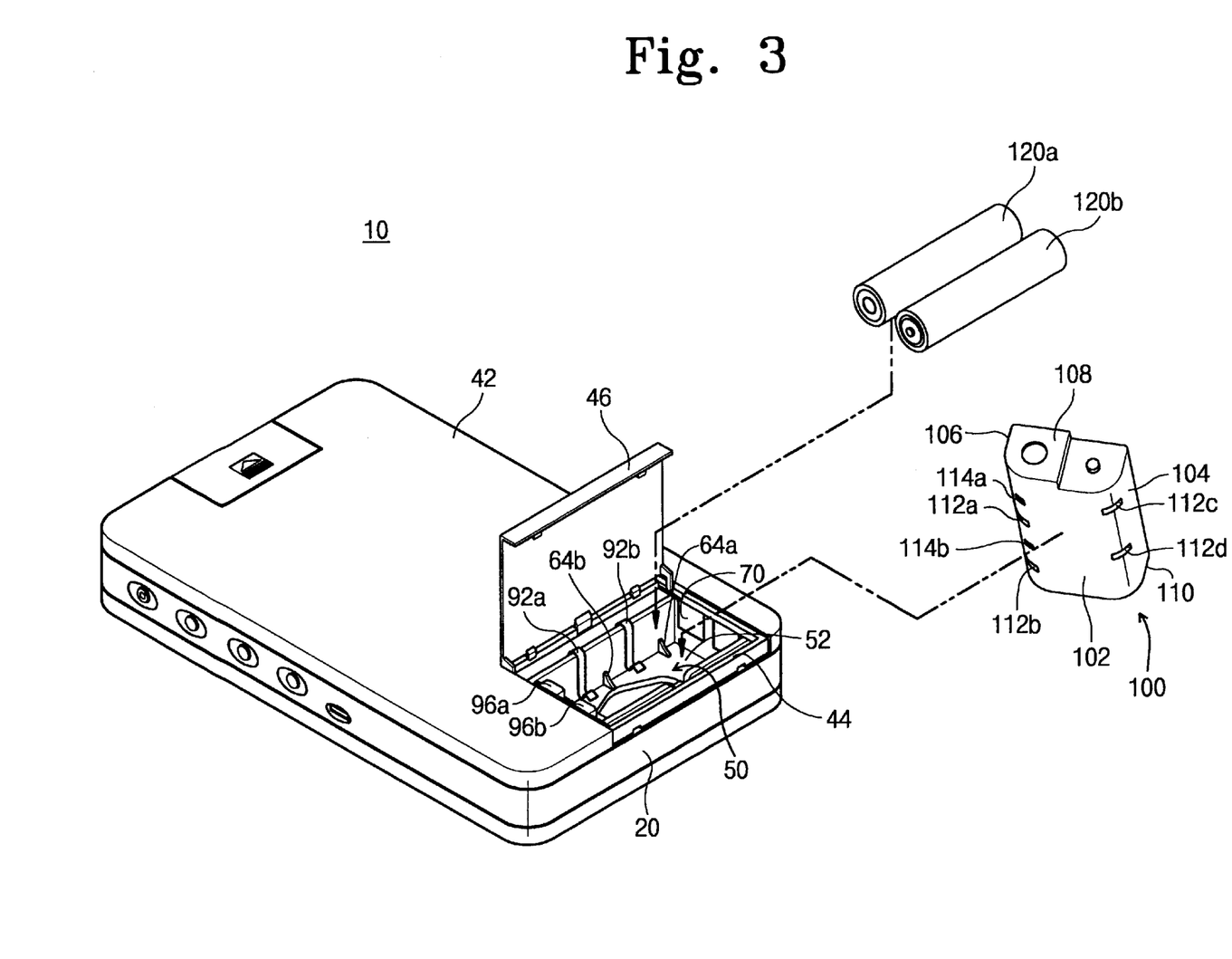
FIG. 3 is a perspective view illustrating the selective insertion of the battery pack or ordinary batteries into the battery storage casing through the battery door opening in the inventive wallet personal computer, in accordance with the principles of the present invention.

Referring to FIGS. 1 to 3, a wallet personal computer (PC) 10 has a battery storage casing 50 for accommodating either ordinary batteries 120a, 120b or a specific rechargeable battery pack 100. The wallet personal computer 10 comprises a housing 20, cover 42, display assembly 40, chassis 68, and printed circuit board (PCB) 80. The battery storage casing 50 is formed integrally with the chassis 68. The chassis 68 is to hold the display assembly 40 and printed circuit board 80 the is internal space of the personal computer 10 formed by the housing 20 protected by the cover 42. Of course, the display assembly 40, printed circuit board 80 and battery storage casing 50 may be mounted in the housing 20 in various ways. In the present embodiment, the battery storage casing 50 has a tab 65 externally formed on its left side wall 58, through which a screw 66 penetrates to fix it to housing 20. The housing 20 has an upper mounting opening 22 closed by the cover 42, and a bottom 24 provided with a display opening 34 through which the screen of the display assembly 40 is exposed.

The battery storage casing 50 is formed integrally with one side of the chassis 68, having front, back, left and right side walls 54, 56, 58 and 60, and a bottom 52. The battery storage casing 50 has an upper battery insertion opening, mounted in the housing 20 of the wallet personal computer 10 so that the upper battery insertion opening faces a battery door opening 44 formed in the cover 42. The battery door opening 44 is closed and opened by a door 46, through which the specific battery pack 100 or ordinary batteries 120a, 120b are mounted or removed in or from the battery storage casing 50. The door 46 is to protect the inside of the wallet personal computer 10. The right side wall 60 of the battery storage casing 50 is associated with first metal strip 70, and the left side wall 58 with second metal strips 96a, 96b. The first and second metal strips 70, 96a, 96b contact the electrodes of the battery pack or ordinary batteries to supply power to the printed circuit board 80. In this case, the second metal strips 96a, 96b are mounted on the printed circuit board 80, associated with the battery storage casing 50.

In addition, a plurality of support ridges 64a, 64b, 64c, 64d are formed between the front and back side walls 54 and 56 and the bottom 52 of the battery storage casing 50 so that they may be held by the corresponding recesses 112a, 112b, 112c, 112d formed on the front and back sides 104 and 106 of the battery pack 100. The support ridges 64a, 64b, 64c, 64d and corresponding recesses 112a, 112b, 112c, 112d serve to securely mount the battery pack 100 in the battery storage casing 50. To this end, the support ridges 64c, 64d formed in the front side wall of the battery storage casing 50 are arranged asymmetrically with those 64a, 64b formed in the back side wall 56 about the longitudinal center line of the battery storage casing 50. This helps the electrodes of the battery pack 100 properly contact the second metal strips 96a, 96b.

The printed circuit board 80 includes a charging circuit and charging-protective circuit (not shown in the drawings) together with the electronic circuits providing for the functions of the wallet personal computer 10. It is provided with a receiving cut 85 having front, back and left sides 90, 86 and 88 which respectively contact the front, back and left side walls 54, 56 and 58 of the battery storage casing 50 inserted in the receiving cut 85. The printed circuit board 80 is divided into main part 82 and extension 84 around the receiving cut 85. The main part 82 is supported by the chassis 68, and the extension 84 by the holder 67 formed in the front side wall 54 of the battery storage casing 50. The second metal strips 96a, 96b are mounted on the left side 88 of the receiving cut 85 connected with the charging circuit 210. The second metal strips 96a, 96b electrically connect the battery pack 100 or ordinary batteries 120a, 120b mounted in the battery storage casing 50 with the printed circuit board 80, whereby the printed circuit board 80 is supplied with power or the consumed battery pack 100 is recharged. As in the present embodiment, when there are two cylindrical ordinary batteries 120a, 120b to substitute for the consumed battery pack, the first metal strip 70 electrically connects the two batteries while the second metal strips 96a, 96b electrically connect the two batteries with the printed circuit board 80. The printed circuit board 80 is provided with a charging-protective circuit 200. The back side 86 of the receiving cut 85 is provided with charging-protective circuit contacts 92a, 92b, whose end portions 94a, 94b are placed on the bottom 52 of the battery storage casing 50 when the printed circuit board 80 is held by the chassis 68. These end portions 94a, 94b electrically contact the respective pack contacts 114a, 114b exposed on the lower side 102 of the battery pack 100. In this way, the second metal strips 96a, 96b and charging protective circuit contacts 92a, 92b are arranged in the printed circuit board 80 so as to be placed in the battery storage casing 50 associated with the printed circuit board 80. The charging-protective circuit 200 is connected with contacts 92a, 92b, and second metal strips 96a, 96b.

As shown in FIGS. 1 to 3, the inventive wallet personal computer 10 is designed to use two cylindrical ordinary batteries 120a, 120b standardized according to various standards and standards organizations such as International Electrotechnical Commission (IEC), International Organization for Standardization (ISO), American National Standard Institute (ANSI), Japan Industrial Standard (JIS), and others. In addition, the specific battery pack 100 is designed to have the same dimension as the two ordinary batteries 120a, 120b combined, so that the battery storage casing 50 may accommodate either two batteries 120a and 120b or one battery pack 100. Referring to FIG. 3, the 104 battery pack 100 has front, back, left and right sides 104, 106, 108 and 110. The left side 108 is provided with the electrodes to contact the second metal strips 96a, 96b. The distance between the front and the back side 104 and 106 of the battery pack is designed to match the sum of the diameters of the two ordinary batteries 120a, 120b or the distance between the front and the back side walls 54 and 56 of the battery storage casing 50. Likewise, the distance between the left and the right sides 108 and 116 of the battery pack is designed to match the length of the batteries 120a, 120b or the distance between the left and the right side walls 58 and 60 of the battery storage casing.

Figure 4:
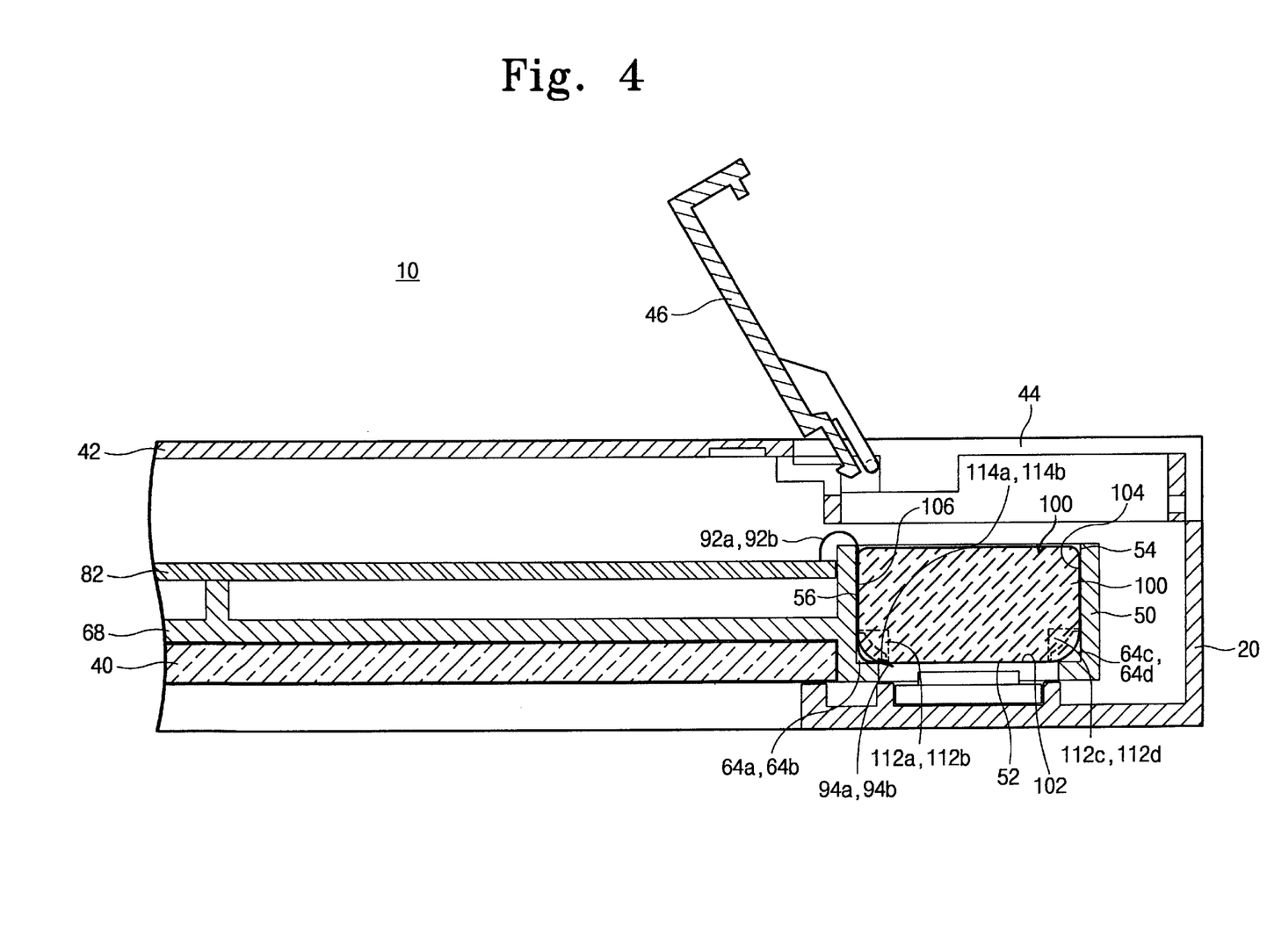
FIG. 4 is a cross sectional view illustrating the specific battery pack arranged in the battery storage casing, in accordance with the principles of the present invention.
Figure 5:
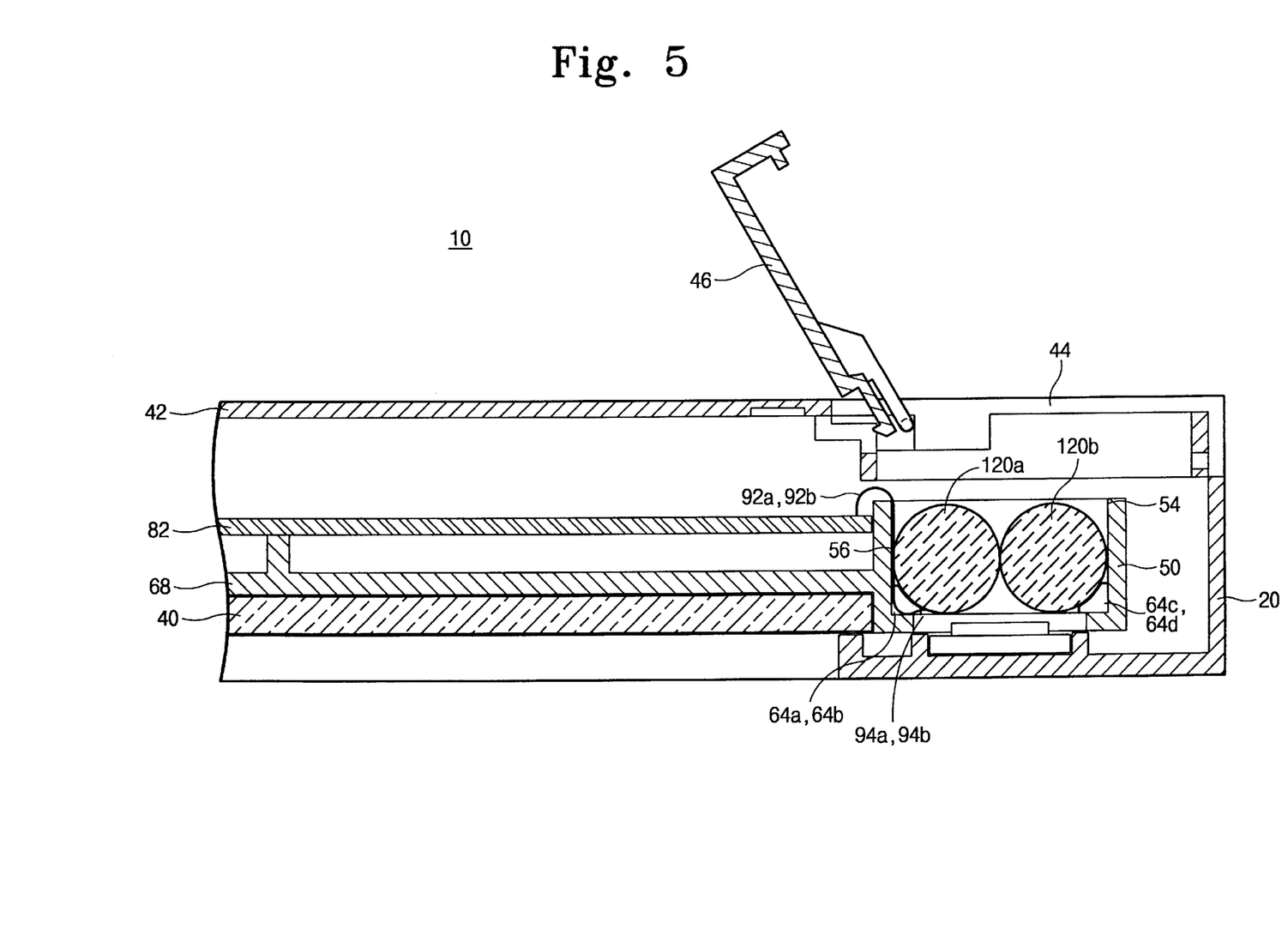
FIG. 5 is a cross sectional view similar to FIG. 4 but with the ordinary batteries inserted in the battery storage casing instead of the specific battery pack, in accordance with the principles of the present invention.

Referring to FIGS. 4 and 5, the cross sectional views show that the specific battery pack 100 or ordinary batteries 120a, 120b are snugly mounted in the battery storage casing 50 because the dimension of the battery storage casing 50 matches those of the battery pack 100 and ordinary batteries 120a and 120b. The battery pack 100 and ordinary batteries 120a, 120b may be all rechargeable batteries. As described above, the battery pack 100 may be stably recharged especially with the help of the charging-protective circuit. When the battery pack 100 is detachably mounted in the battery storage casing 50 as shown in FIG. 4, the pack contacts 114a, 114b exposed on the lower side 102 of the battery pack 100 contact respectively the end portions 94a, 94b of the charging-protective circuit contacts 92a, 92b connected to the charging-protective circuit of the printed circuit board 80. This serves to protect the battery pack 100 in recharging. The support ridges 64a, 64b, 64c, 64d are respectively held by the recesses 112a, 112b, 112c, 112d formed in the battery pack 100, and in addition, formed to correspond with the peripheral surface of the ordinary batteries 120a, 120b. In this way, they properly support the battery pack 100 or ordinary batteries 120a, 120b.

Is Thus, the internal space of the inventive battery storage casing is designed to accommodate either the specific rechargeable battery pack or ordinary batteries, and terminal contact members disposed in the battery storage casing to electrically connect the specific battery pack or ordinary batteries with the printed circuit board of the wallet personal computer. Of course, the number of the ordinary batteries substituted for the specific battery pack may be variable according to the kind of portable computer. Hence, the portable computer may be driven by the specific rechargeable battery pack or one or more ordinary batteries installed in the battery storage casing.

The wallet personal computer 10 can receive power from an external source. The wallet personal computer 10 can receive power from either the battery pack 100 or the plurality of individual batteries 102a and 102b. When the wallet personal computer 10 is receiving power from an external source, the specific rechargeable battery pack 100 can be recharged by the wallet personal computer 10. During such recharging, the battery pack 100 can be protected because of the use of the charging-protective circuit contacts 92a and 92b and battery pack contacts 114a and 144b. The battery pack 100 can be protected against damage corresponding to overcharging, for example. The charging of the battery pack 100 can be stabilized by the charging-protective circuit.

The internal space of the inventive battery storage casing can be designed to accommodate (1) either a specific battery pack or one ordinary battery; (2) either a specific battery pack or two ordinary batteries; (3) either a specific battery pack or three ordinary batteries; (4) either a specific battery pack or four ordinary batteries; (5) either one large specific battery pack or two small specific battery packs or four ordinary batteries; or (6) either one large specific battery pack or one small specific battery pack and two ordinary batteries. As will be easily understood by one skilled in the art, a variety of combinations of specific battery packs and ordinary batteries are envisioned and described here. Other similar combinations are within the scope of the applicant's general inventive concept. In each combination of battery units, no extra battery adapter unit is required to be used with the ordinary batteries to enable the ordinary batteries to properly fit in the battery storage casing.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. A computer apparatus, comprising:
   a housing forming a battery door orifice in a side of said housing, said housing receiving a plurality of electronic units and at least one printed circuit board;
   a battery storage unit having a bottom wall and four side walls and an upper battery insertion orifice, said battery storage unit receiving one selected from among a rechargeable battery pack and a plurality of individual batteries, said plurality of individual batteries being selected from among rechargeable individual batteries and non-rechargeable individual batteries, said battery storage unit being formed to accommodate the battery pack, said battery storage unit being formed to accommodate the plurality of individual batteries, said battery storage unit being fixedly mounted in said housing with said upper battery insertion orifice facing the battery door orifice, the battery pack and the plurality of individual batteries corresponding to power sources supplying power to said apparatus; and
   a protective circuit protecting the battery pack when the battery pack is in said battery storage unit and stabilizing a charging of the battery pack, said protective circuit being installed on said printed circuit board;
   said protective circuit protecting the rechargeable individual batteries when the rechargeable individual batteries are in said battery storage unit and stabilizing a charging of the rechargeable individual batteries.

2. The apparatus of claim 1, said apparatus selectively recharging the battery pack when the battery pack is received by said battery storage unit.

3. The apparatus of claim 2, said battery storage unit having at least one support ridge formed between said bottom wall and side walls, and the battery pack having at least one corresponding recess to receive said at least one support ridge, said at least one support ridge being received by said at least one corresponding recess when the battery pack is properly inserted in said battery storage unit.

4. The apparatus of claim 3, further comprising:
   a first plurality of electrical contacts being connected to said protective circuit; and
   a second plurality of electrical contacts being formed in one side of said battery storage unit and being connected with said first electrical contacts, performing said stabilizing of said charging of the battery pack.

5. The apparatus of claim 1, the plurality of individual batteries corresponding to rechargeable batteries.

6. The apparatus of claim 1, the battery pack having a first size, each individual battery among the plurality of individual batteries having a second size smaller than the first size, the plurality of individual batteries together having an overall size approximately corresponding to the first size.

7. The apparatus of claim 1, further comprising:
said protective circuit protecting the battery pack from damage when said apparatus performs a charging of the battery pack;
a plurality of first electrical contacts being connected to said protective circuit; and
a plurality of second electrical contacts being formed in one side of said battery storage unit and being connected with said first electrical contacts, said second electrical contacts being connected with electrical contacts of the battery pack and performing said stabilizing of said charging of the battery pack.

8. A computer apparatus, comprising:
a housing forming a battery door orifice in a side of said housing, said housing receiving a plurality of electronic units and at least one printed circuit board;
a battery storage unit having a bottom wall and four side walls and an upper battery insertion orifice, said battery storage unit receiving one selected from among a battery pack and at least one individual battery, said at least one individual battery being selected from among a rechargeable individual battery and a non-rechargeable individual battery, said battery storage unit being formed to accommodate the battery pack, said battery storage unit being formed to accommodate the at least one individual battery, said battery storage unit being fixedly mounted in said housing with said upper battery insertion orifice facing the battery door orifice, the battery pack and the at least one individual battery corresponding to power sources supplying power to said apparatus;
a plurality of terminal contact members disposed in said battery storage unit, said terminal contact members electrically connecting the battery pack with said printed circuit board when said battery storage unit receives the battery pack, said terminal contact members electrically connecting the at least one individual battery with said printed circuit board when said battery storage unit receives the at least one individual battery, said power source supplying power to said apparatus through said plurality of terminal contact members; and
a protective circuit being coupled to said printed circuit board, protecting the battery pack from damage when said apparatus performs a charging of the battery pack, stabilizing said charging;
said protective circuit protecting said at least one rechargeable individual battery from damage when said apparatus performs a charging of said at least one rechargeable individual battery.

9. The apparatus of claim 8, further comprising:
a plurality of first electrical contacts being connected to said protective circuit; and
a plurality of second electrical contacts being formed in one side of said battery storage unit and being connected with said first electrical contacts, said second electrical contacts being connected with electrical contacts of the battery pack and performing said stabilizing of said charging of the battery pack.

10. The apparatus of claim 9, further comprising a door being removably connected to said apparatus, said door blocking the battery door orifice when connected to said apparatus, said door not blocking the battery door orifice when not connected to said apparatus.

11. The apparatus of claim 10, further comprising a chassis holding said printed circuit board fixed in said housing, said battery storage unit being integrally formed with said chassis.

12. An apparatus, comprising:
a battery-operated portable device;
a battery compartment being fixedly mounted in said device, said battery compartment removably storing one selected from among a first battery and a plurality of second batteries in an interior thereof, said battery compartment being formed to accommodate said first battery, said battery compartment being formed to accommodate said plurality of second batteries, said battery compartment having a plurality of conductive members connecting with respective terminals of said first battery when said first battery is stored in said battery compartment, said battery compartment having a plurality of conductive members connecting with respective terminals of said plurality of second batteries when said plurality of second batteries is stored in said battery compartment, said battery compartment having a battery door by which a user accesses said interior of said battery compartment; and
a protective circuit protecting said first battery when said first battery is in said battery compartment and stabilizing a charging of said first battery, said protective circuit being installed in said portable device.

13. The apparatus of claim 12, said device having a housing forming a battery door orifice in a side of said housing, said housing receiving a plurality of electronic units and at least one printed circuit board.

14. The apparatus of claim 13, said battery compartment having a bottom wall and four side walls and an upper battery insertion orifice, said battery compartment being mounted in said housing with said upper battery insertion orifice facing the battery door orifice, said battery door selectively covering the battery door orifice, said first battery and said plurality of second batteries corresponding to power sources supplying power to said apparatus.

15. The apparatus of claim 14, said first battery corresponding to a rechargeable battery pack, said apparatus selectively recharging the battery pack when said first battery is stored in said battery compartment.

16. The apparatus of claim 15, the plurality of individual batteries corresponding to rechargeable batteries.

17. The apparatus of claim 15, said first battery having a first size, each individual battery among said plurality of second batteries having a second size smaller than said first size, said plurality of second batteries together having an overall size approximately corresponding to said first size.

18. The apparatus of claim 15, said battery compartment having at least one support ridge formed between said bottom wall and side walls, and said first battery having at least one corresponding recess to receive said at least one support ridge, said at least one support ridge being received by said at least one corresponding recess when said first battery is properly inserted in said battery compartment.

19. The apparatus of claim 15, further comprising:
a first plurality of electrical contacts being connected to said protective circuit; and
a second plurality of electrical contacts being formed in one side of said battery compartment and being connected with said first electrical contacts, performing said stabilizing of said charging of said first battery.

20. The apparatus of claim 15, further comprising:
said protective circuit protecting said first battery from damage when said apparatus performs a charging of said first battery;

a plurality of first electrical contacts being connected to said protective circuit; and a plurality of second electrical contacts being formed in one side of said battery compartment and being connected with said first electrical contacts, said second electrical contacts being connected with electrical contacts of said first battery and performing said stabilizing of said charging of said first battery.

21. A method, comprising:

coupling a battery storage unit with a housing, said housing receiving a plurality of electronic units and a printed circuit board;

inserting one battery unit selected from among a rechargeable battery pack and at least one individual battery into said battery storage unit, said at least one individual battery being selected from among a rechargeable individual battery and a non-rechargeable individual battery, said battery storage unit being formed to accommodate said battery pack, said battery storage unit being formed to accommodate said at least one individual battery, said battery pack and said at least one individual battery corresponding to power sources supplying power to said plurality of electronic units;

arranging a plurality of terminal contact members in said battery storage unit, said terminal contact members electrically connecting said battery pack with said printed circuit board when said battery storage unit receives said battery pack, said terminal contact members electrically connecting said at least one individual battery with said printed circuit board when said battery storage unit receives said at least one individual battery, said power source supplying power to said plurality of electronic units through said plurality of terminal contact members; and charging said rechargeable battery pack and said rechargeable individual battery;

protecting said rechargeable battery pack and said rechargeable individual battery from damage when said charging is performed; and stabilizing said charging, said protecting and stabilizing being performed by a protective circuit installed within said housing.

22. The method of claim 21, further comprising:

forming a battery door orifice in said housing; and forming said battery storage unit adjacent to said battery door orifice, said battery storage unit having a bottom wall and four side walls and an upper battery insertion orifice, said upper battery insertion orifice being adjacent to said battery door orifice.

23. The method of claim 22, further comprising:

removing said rechargeable battery pack from said battery storage unit; and inserting two individual rechargeable batteries into said battery storage unit, said rechargeable battery pack having a first size, each one of said two individual rechargeable batteries having a second size being smaller than said first size, said two individual rechargeable batteries together having an overall size approximately corresponding to said first size.

* * * * *